United States Patent [19]

Buggert

[11] Patent Number: 4,508,070

[45] Date of Patent: Apr. 2, 1985

[54] ARRANGEMENT IN THE COMBUSTION CHAMBER OF AN INTERNAL COMBUSTION ENGINE

[75] Inventor: Peter O. Buggert, Stockholm, Sweden

[73] Assignee: Oktan Aktiebolag, Stockholm, Sweden

[21] Appl. No.: 481,885

[22] Filed: Apr. 4, 1983

[30] Foreign Application Priority Data

Apr. 19, 1982 [SE] Sweden ................................ 8202442

[51] Int. Cl.[3] ........................... F02F 7/00; F16J 11/00

[52] U.S. Cl. ......................... 123/193 CP; 204/192 E; 156/643

[58] Field of Search ......... 123/193 P, 193 C, 193 CP, 123/671; 204/192 E; 156/664, 643

[56] References Cited

U.S. PATENT DOCUMENTS

| | | | |
|---|---|---|---|
| 3,723,209 | 3/1973 | Hamada et al. | 123/193 CP |
| 3,896,009 | 7/1975 | Kobayashi et al. | 123/193 C |
| 3,945,893 | 3/1976 | Ishimori et al. | 204/16 |
| 4,123,996 | 11/1978 | Gillbrand et al. | 123/1 R |

*Primary Examiner*—Craig R. Feinberg
*Assistant Examiner*—David A. Okonsky
*Attorney, Agent, or Firm*—Shapiro and Shapiro

[57] ABSTRACT

In internal combustion engines with electric ignition being driven with petrol, at least part of the area of the combustion chamber and/or piston head is provided with a very fine surface structure which reduces the octane number requirements of the engine.

8 Claims, 2 Drawing Figures

ARRANGEMENT IN THE COMBUSTION CHAMBER OF AN INTERNAL COMBUSTION ENGINE

SUMMARY OF THE INVENTION

The present invention relates to an arrangement in the combustion chamber of internal combustion engines with electric ignition which are driven by preferably lead-containing petrol or the like, i.e. so-called Otto cycle engines. Characteristic of the invention is that at least part of the area of the combustion chamber and/or piston head is provided with a very fine surface structure which reduces the octane number requirements of the engine. At the same time the purity of the exhaust gases is improved without the engine power being impaired.

The purpose of the very fine surface structure may be to promote the formation of primarily the red lead monoxide but also the yellow lead monoxide and/or beta-lead oxide. Thus the surface structure will give growth to the desired lead oxides, i.e. it will function as some kind of catalyst therefor. However, the surface structure has been found to have the intended effect also in case of operation with petrol containing no lead.

The combustion process is as follows: the flame front, which is initiated by the ignition plug spark, spreads in the combustion chamber at the same time as the unburned fuel-air mixture is compressed and heated. If the temperature and the pressure in this unburned gas mixture attains critical values before the normal flame front has passed through the entire gas mixture, the residual gas auto-ignites and causes knocking. It is in the unburned residual gas that the present lead compounds commence to function and prevent knocking. The lead compounds decompose thermally and oxidize in the residual gas zone and form a cloud or a mist of solid lead oxide particles which prevent knocking by counteracting or destroying knock-promoting hydrocarbon radicals and other components which would otherwise start the auto-ignition. The solid microscopic decomposition products, which improve the knocking characteristics of fuels for Otto engines, consist of the three above-mentioned lead oxides, i.e. the red lead monoxide, the yellow lead monoxide and the beta-lead oxide.

DETAILED DESCRIPTION OF THE INVENTION

Figure 1:
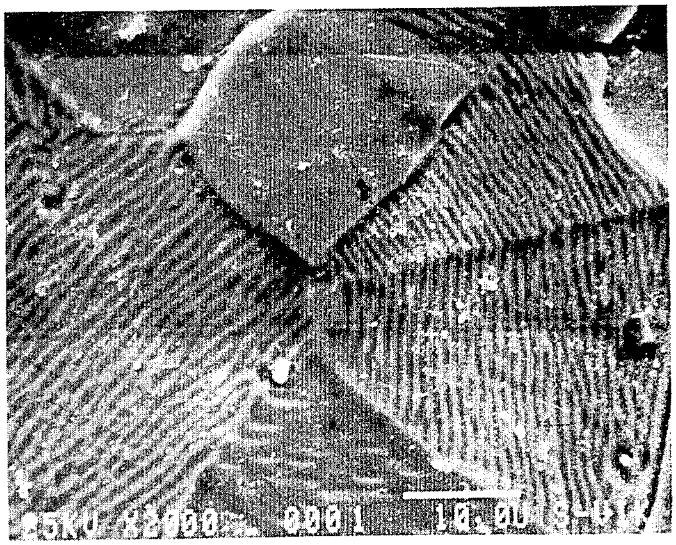
FIG. 1 is a high-polished stainless plate enlarged 2000 times.

In a preferred embodiment the very fine surface structure may consist of grooves and/or other type of depressions in the surface which have respectively a width and diameter of up to about 3μ, preferably 2.5μ, while they have a depth of up to about 1μ. Tests carried out show that a specifically good effect is obtained if the grooves or other depressions in the surface have a width of about 1μand a depth of about 0.3–0.7μ, preferably 0.5μ. 1μ=0.000001 m=0.001 mm.

The grooves may have generally parallel edges. They may also have a generally V-shaped cross-section. The grooves should preferably run at least substantially in parallel with each other, and the distance between them should be of the same size as the width of the grooves, i.e. 1–3μ. The parallel grooves may be crossed by grooves running at angles to them so that the grooves will together form a check pattern where the checks for example are substantially square.

The very fine surface structure is preferably made on a high-polished surface, and the transitions between the surface and the grooves or other depression are suitably sharp edges. However, the surface structure can also be made on a normally processed surface because due to its fineness it can be formed on the high as well as the low portions of this surface. The very fine surface structure can be considered to constitute a micro-structure of a fineness of quite another size than the surface structure of the normally processed surface.

The surface structure according to the invention can be obtained in many ways. Thus it can be obtained by ion-etching, e.g. sputter-etching, the time for it being so chosen that the desired structure will be obtained. The surface structure can also be effected by laser, by chemical etching, or sand blasting. In the latter case the blaster sand must have a very small particle size. Thus, for example silicon carbide sand with an average size of about 3μ can be used in the sand blasting. A larger particle size may also be used, which presupposes a relatively low blasting pressure. This will substantially only result in crater-like depressions, while by ion-etching it is possible to obtain crater-like depressions and/or linear structure, and the gap between the lines should be approximately equal to the width of the lines, i.e. 1–3μ.

In one embodiment the cylinder walls in the combustion chamber as well as the total area of the piston head and the portions of the ignition plug and of the valve facing the combustion chamber should be provided with the very fine surface structure. As a rule it is sufficient, however, if a minor portion of said surfaces are provided with the fine surface structure. Thus, it would be sufficient to provide the total area of the piston head with the surface structure in question. Under any circumstances the area provided with the very fine surface structure should have a size corresponding at least to a tenth of the piston area.

The very fine surface structure may be suitably made on the piston head proper. Especially in old engines said surface may be made on a specific plate which is mounted on an already existing piston or the like.

An investigation, accounted for below, will confirm the power obtained by means of the present invention.

The purpose of the investigation has been to analyse the influence of the surface structure of the piston head on the knocking intensity. It should be noted in this connection that the temperature in the combustion chamber has a certain relation to the knocking intensity and consequently is a measure of the octane number of the fuel. A lower temperature indicates a lower knocking intensity and corresponds to a higher octane number of the fuel.

The equipment was a 1-cylinder 4-stroke engine of the Briggs & Stratton make provided with a D.C. generator for variable loading of the engine. The temperature was measured by means of a thermo-element mounted in the combustion chamber.

Two stainless plates having a thickness of 1.8 mm and a different surface structure were used. Each plate was screwed on the piston head with three screws. The thickness of the plates was compensated for by an extra cylinder head gasket.

The surface structure of the two stainless plates:

A. Rough-turned, corresponding to the original appearance of the piston. Was used in Test 1.

B.

Sputter-etched pattern on a high-polished plate. Was used in Test 2.

Test fuel. Octane number=70 with the lead content 0.2 g/l.

The fuel consisted of the mixture 40 vol % exhaust gas 100 LL and 60 vol % Jet B.

Prior to the investigation three test fuels with the octane numbers 86, 78 and 70 were prepared. After preliminary tests the fuel with octane number 70 was chosen since it was required for the main tests that knocking should take place when the engine was run with the original piston.

Before the main tests were started the engine was run for about 15 min. and as an introduction to Test 1 the temperatures on the outside of the cylinder and during the exhaust were measured with thermo-elements for checking purposes.

Test 1 with the piston head according to the A-design.

| Testing time minutes | Temperature °C. in combustion chamber | Engine load ampere (A) |
|---|---|---|
| 5 | 235 | 4.0 |
| 8 | 235 | 4.5 |
| 10 | 244 | 8.0 |
| 12 | 247 | 10.0 |
| 14 | 256 | 14.5 |

Test 2 with the piston head according to the B-design.

| Testing time minutes | Temperature °C. in combustion chamber | Engine load ampere (A) |
|---|---|---|
| 2 | 188 | 4.5 |
| 3 | 198 | 4.5 |
| 4 | 208 | 4.5 |
| 5 | 215 | 8.0 |
| 5.5 | 220 | 8.0 |
| 6.5 | 218 | 8.0 |
| 8.5 | 230 | 14.5 |
| 10.5 | 233 | 14,5 |
| 11.5 | 235 | 14.5 |
| 12.5 | 235 | 14.5 |

Note: After disassembling it was noted that the piston head was less oily than in the preceding test.

Test 2 with sputter-etched surface on the piston head gave the lowest temperature and knocking intensity, which corresponds to an increased octane number in the fuel. The difference was apparent over the total load area.

With the guidance of some temperature and octane number determinations according to the so-called Aviation method an evaluation was made stating that Test 2 as compared to Test 1 involves an octane number increase of about 5.5 to 75.5 (70+5.5) and consequently a power increase of about 12%.

An octane number increase with 5 units obtained because the piston head is provided with a sputter-etched pattern results in the following:

1. An engine requiring the octane number 93 can be run with 88 octane petrol.
2. an engine requiring the octane number 98 can be run with 93 octane petrol.
3. An engine requiring the octane number 98 can be given increased power by means of a sputter-etched pattern if it is run with 98 octane petrol.

The enclosed pictures which were photographed in an electronic microscope show some surface structures, chosen by way of example, which have resulted in the intended octane number increase.

FIG. 1 shows the surface structure of the high-polished stainless plate used in the above Test 2, the enlargement being 2000 times. From the line on the picture at the right-hand lower corner, the length 10μ is apparent. The surface was sputter-etched for 30 minutes, the surface structure substantially consisting of groups of grooves running generally in parallel with each other.

Figure 2:
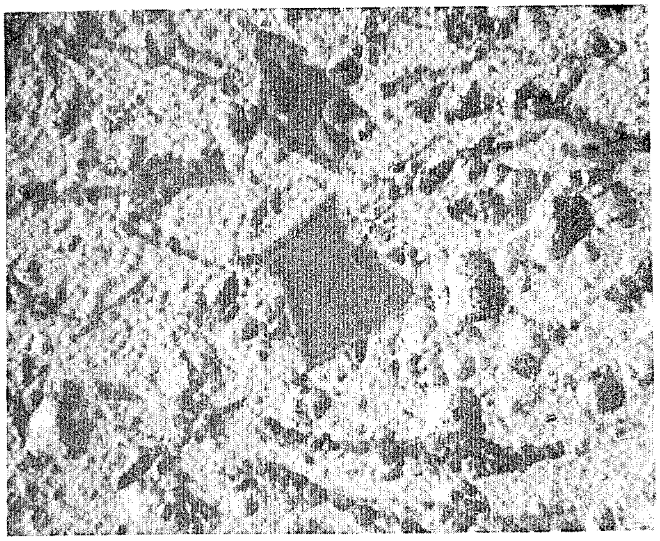
FIG. 2 is a high polished light metal plate enlarged 1000 times.

FIG. 2 shows the surface structure of a high-polished light metal plate, the enlargement being 1000 times. This plate has, like the stainless plate according to FIG. 1, been screwed on to the piston head for a test which has shown that the plate has given an octane number increase of between 7.0 and 10.4 octane number units. The light metal plate, which consists of a special aluminium alloy, was sputter-etched for 4 hours, the surface structure substantially consisting of crater-like depressions.

The invention is not restricted to that described above but may be modified within the scope of the appended claims.

What I claim and desire to secure by Letters Patent is:

1. In an internal combustion engine having at least one combustion chamber with a piston operable therein, the combustion chamber being supplied with preferably lead-containing petrol or the like and having electric ignition, the improvemtent wherein an area of at least one of a surface of the combustion chamber and a head surface of the piston has means for reducing the octane number requirements of the engine, said means being constituted by a very fine surface structure comprising depressions, such as a plurality of grooves, said depressions being distributed throughout said area and each having a width up to about 3 microns and a depth up to about 1 micron.

2. The improvement of claim 1, wherein each of the depressions has a width of about 1 micron and a depth of about 0.5 micron.

3. The improvement of claim 1, wherein the depressions have generally parallel edges.

4. The improvement of claim 1, wherein the depressions have generally V-shaped cross-sections.

5. The improvement of claim 1, wherein the very fine surface structure has an area corresponding to at least a tenth of the piston head area.

6. The improvement of claim 1, wherein the very fine surface structure is formed in a highly polished surface.

7. The improvement of claim 1, wherein the depressions comprise substantially parallel grooves.

8. The improvement of claim 7, wherein the depressions comprise sets of parallel grooves at right angles.

* * * * *